United States Patent [19]
Guillotin et al.

[11] 3,901,772
[45] Aug. 26, 1975

[54] METHOD OF SEALING BY BRAZING OF A METAL PART ON A CERAMIC PART

[75] Inventors: Fernand Guillotin, St-Michel-sur-Orge; Rene Cerutti, Bagnolet, both of France

[73] Assignee: Quartex Societe pour l'Application des Hautes Temperatures, Paris, France

[22] Filed: Nov. 26, 1973

[21] Appl. No.: 419,056

[30] Foreign Application Priority Data
Dec. 1, 1972 France .................. 72.42740

[52] U.S. Cl. .............. 204/16; 29/473.1; 204/20; 204/26
[51] Int. Cl. .................. C23b 7/00; C23b 5/60
[58] Field of Search ............ 204/16, 38 B, 38 S, 40, 204/20, 26; 29/473.1, 472.9, 473.3, 474.4, 500, 502, DIG. 4

[56] References Cited
UNITED STATES PATENTS

| | | | |
|---|---|---|---|
| 2,722,496 | 11/1955 | Hosmer | 29/473.1 |
| 2,821,013 | 1/1958 | Schell | 204/20 |
| 3,006,069 | 10/1961 | Rhoads et al. | 29/473.1 |
| 3,023,492 | 3/1962 | Bristow | 29/473.1 |
| 3,290,171 | 12/1966 | Zollman | 29/473.1 |

*Primary Examiner*—T. M. Tufariello
*Attorney, Agent, or Firm*—Young & Thompson

[57] ABSTRACT

The present invention relates to a method of brazing a fluid-tight sealing joint between a metal part and a part of ceramic material, of the kind in which, before the actual brazing is carried out, the said ceramic part is first metallized by the application of a metallization product containing at least one metallic derivative, and sintering the said product, followed by nickelling of the ceramic part thus metallized, the operations of metallization being repeated twice, said method comprising the further steps of effecting the metallization of said ceramic part by applying said metallization product and effecting two successive nickelling operations on the ceramic part thus metallized, a first nickelling operation being effected chemically by the application of a nickelling product and reduction of said product under heat, while a second nickelling operation is carried out by an electrolytic process. The invention finds a particular application in the brazing of joints sealing a metallic conductor into a bore passing through a ceramic part.

7 Claims, 10 Drawing Figures

METHOD OF SEALING BY BRAZING OF A METAL PART ON A CERAMIC PART

The present invention relates generally to the assembly by brazing of a metallic part to a ceramic part, and is more particularly directed to the case in which this metallic part is a longilinear conductor to be sealed in a fluid-tight manner in a bore passing through the ceramic element.

Parts of this kind are used in particular for the control of electrical devices mounted inside a chamber closed in a fluid-tight manner by a ceramic insulating plug, the control of the said devices being effected by conductors passing through the said plug.

By the term ceramic in the present text, it is intended to cover all varieties of insulating, refractory and fluid-tight materials currently employed in electronics, and more generally in the field of vacua, such as for example, alumina at various degrees of purity, sapphire, forsterite, beryllium oxide, etc.

With refard to the metals constituting the metallic part, and more particularly the conductor to be sealed to such a ceramic, there may be employed pure metals, such as for example titanium, niobium, tungsten, molybdenum or metallic alloys of one or more metals such as for example the nickel-iron, nickel-chrome-iron, nickel-cobalt-iron, nickel-chrome, these metals or alloys being chosen so as to have coefficients of expansion close to those of the ceranic parts to which they are to be sealed.

In order to ensure the sealing of a metal part on a ceramic part, it is necessary to metallize this ceramic part, and in the usual manner this metallization is effected by the depositing of a metallization product containing at least one metallic derivative such as molybdenum, tungsten, manganese, iron, titanium, titanium oxide, for example, and then by heating under hydrogen or under vacuum of the ceramic part thus coated with this metallization product. During the course of this heating, the metallization product reacts chemically with the underlying ceramic and forms at the surface of this latter a complex layer, the composition of which varies progressively from the ceramic proper in its inmost portion, to the metal deposited in its outermost portion.

In order subsequently to facilitate good wetting of the brazing with the ceramic part thus metallized, it is usual to apply to this latter a surface nickelling in addition.

This surface nickelling is frequently effected by electrolysis.

When it is desired to effect, by means of this process, the sealing by brazing of a metallic conductor in a bore formed in a ceramic part, numerous difficulties are encountered.

In the first place, it is difficult to deposit a uniform layer of the metallization product over the whole of the internal wall of the bore of the ceramic part.

In addition, it is difficult to carry out satisfactory nickelling of the internal wall of this bore when previously metallized.

Finally, it is difficult to obtain a uniform distribution of the brazing between the metallic conductor and the internal wall of the bore in which it is engaged.

In consequence, the above-described process results in practice in rejection of a substantial proportion of the parts treated, especially for fluid-tightness defects at the passage of the metallic conductor into the ceramic part.

In order to overcome these difficulties and to obtain good fluid-tightness, it has already been proposed to effect the sealing of the metallic conductor on the ceramic part, not along the whole length of the internal wall of the bore of the ceramic in which the said conductor is engaged, but on the external cylindrical surface of a boss surrounding the said bore at the surface of the ceramic part, a bell-shaped skirt rigidly fixed on the said conductor being engaged on this boss.

It has also been proposed to carry out the sealing in question on the flat, between the ceramic part and a flat flange fixed in a fluid-tight manner on the conductor passing through the said part.

However, these solutions result in a large diametral size of the sealing points thus effected.

In addition, they considerably increase the production cost of these sealing points, due to the necessity which exists of producing a skirt or a flange and to fix this latter in a fluid-tight manner on the metallic conductor to be sealed.

Finally, the sealing points thus effected have reduced mechanical strength since on the one hand the effective sealing surface is relatively small, and on the other hand, the metallic conductor is not furthermore rigidly held in the bore in which it is engaged.

The Applicants have discovered, and this is the object of the present invention, that if in the method of sealing described above, certain conditions of operation are observed, this method is able to lead to the production of a perfectly fluid-tight seal effected as desired between the actual wall of the bore in which the metallic conductor to be sealed is engaged and this metallic conductor, without the addition to this latter of any skirt or peripheral flange.

The method according to the invention, which is generally suitable for sealing by brazing of any part made of metal with any part of ceramic material, is of the kind in which, before effecting the brazing proper, there is first of all effected a metallization of the said ceramic part by the application of a metallization product containing at least one metallic derivative and sintering this product, then a nickelling of the ceramic part thus metallized, and is generally characterized in that the metallization of the ceramic part is effected by brushing over with the said metallization product and then sintering this latter, these metallization operations being repeated twice, and in that two successive nickellings are effected of the ceramic part thus metallized, a first carried out chemically by brushing with a nickelling product and reduction of this latter in the hot state, and a second nickelling carried out electrolytically.

It has in fact been proved, and test confirm this, that on the one hand the repetition of the metallization operation, that is to say the succession of a brushing of the ceramic part with a metallization product and the subsequent sintering of this product, and on the other hand the application of two successive nickelling operations of different natures results in an advantageous manner in a brazing seal which is fluid-tight, solid and strong, this seal extending in a uniform manner over the whole of the wall of the bore in which is engaged the metallic conductor, on which is applied this method of sealing.

The characteristic features and advantages of the invention will furthermore be brought out in the description which follows below by way of example, reference being made to the accompanying diagrammatic drawing, in which.

Figure 1:
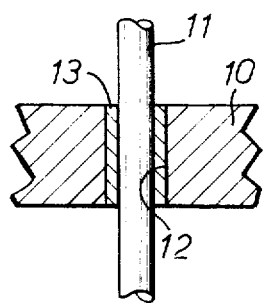
FIG. 1 is a view in cross-section of a ceramic part traversed by a metallic conductor, with a fluid-tight seal of this latter on the said ceramic part.

The drawing illustrates the application of the invention to the fluid-tight passage of a metallic conductor 11 through a ceramic part 10, the said part comprising a bore 12 in which the conductor 11 is engaged, the said conductor being sealed by brazing 13 to the internal wall of the said bore 12 and over the entire height of the said bore.

The conductor 11 is generally longilinear. In practice it has a cylindrical form with a circular section, and its external diameter may be from a fraction of a millimeter to several millimeters.

This conductor 11 may be a solid rod or a hollow rod.

According to one aspect of the invention, the annular clearance J to be provided between the conductor 11 and the internal wall of the bore 12 in which it is engaged (see FIG. 2) must be adjusted with accuracy for the purpose of permitting, during the final brazing operation, a good penetration by capillary attraction of the liquid brazing metal between the conductor 11 and the internal wall of the bore 12, which contributes at the same time to the mechanical strength and the fluid-tightness of the seal subsequently obtained.

For the sake of clearness of the drawing, the peripheral clearance J to be observed has been considerably exaggerated.

In practice, this clearance is comprised between 0.03 and 0.04 mm. for conductors 11 having a diameter equal to or less than 1 mm., and is comprised between 0.04 and 0.05 mm. for conductors 11 having a diameter of several millimeters.

It will however be understood that the numerical values given above by way of example are in no way restrictive of the invention, of which they furthermore do not form any essential part.

Observance of these values simply leads, conjointly with observance of other conditions which will appear below, to obtaining a satisfactory seal by brazing, without it being possible to give in any formal manner a preference to any particular one of these conditions in order to obtain this result.

Preferably, and according to another aspect of the invention, the bore 12 is preceded by a pilot hole or chamfer 14 having a dimension greater than that of the bore.

Figure 2:
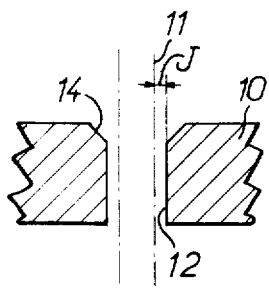
FIGS. 2 to 9 illustrate the stages of production of a seal of this kind, in accordance with the method of the invention.

In the example shown in FIG. 2, this pilot hole or chamfer has a conical form, the angle at the apex of its cone being preferably comprised between 60° and 120°, and its depth being for example in the vicinity of 0.5 mm.

This chamfer has the purpose of permitting a good subsequent flow of the brazing metal towards the interior of the bore 12 during the molten state of this metal.

In the usual manner, the metallization of the internal wall of the bore 12 is carried out first.

Figure 3:
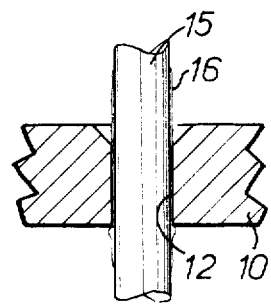

According to an aspect of the invention, this metallization is effected by brushing over this wall with a metallization product of the usual type, preferably taking the form of a fairly liquid paste 16, and is preferably applied by means of a metal rod 15 which is dipped into this paste 16 and which is moved by sliding several times to-and-fro inside the bore 12, as illustrated by FIG. 3.

Figure 4:
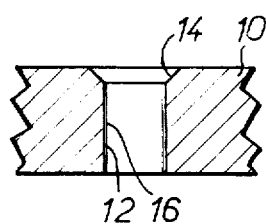

In this process, this paste 16 becomes uniformly distributed over the whole wall of the bore 12, and after having carefully wiped-off the part of this paste which has overflowed from the lower part of this bore, the layer of paste 16 deposited on the wall of the bore 12 is sintered (see FIG. 4).

In the case for example of a metallization product with a base of molybdenum and manganese, this sintering is effected by heating under humid hydrogen at 1550°C. for 5 to 10 minutes.

These metallizations according to the invention are repeated once more, that is to say a fresh brushing of paste 16 is applied by means of a rod 15, this operation being followed by a fresh sintering process.

Nickelling is then effected, and according to the invention, this nickelling is carried out in two phases, following two different processes.

First of all, a nickelling operation is carried out by chemical process with the aid of a nickelling product of the same type as those which are found ready in commerce, and which are constituted essentially by nickel oxide in suspension in a solvent.

Figure 5:
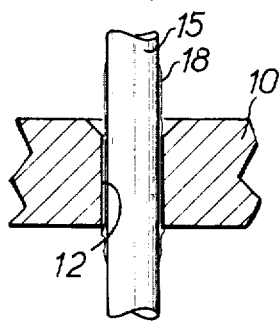

This nickelling is effected by coating with the nickelling product 18 in question, this coating being effected by means of a rod 15 which is dipped as before in the nickelling product and which is caused to slide to-and-fro several times in the bore 12 (see FIG. 5).

Figure 6:
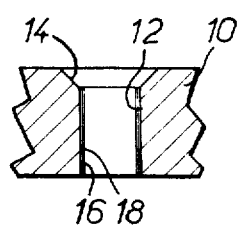
Figure 7:
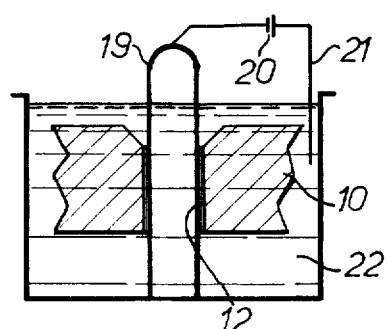
Figure 8:
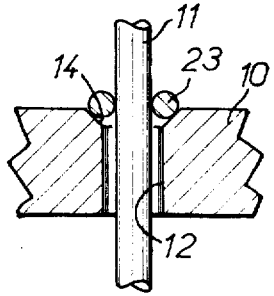
Figure 9:
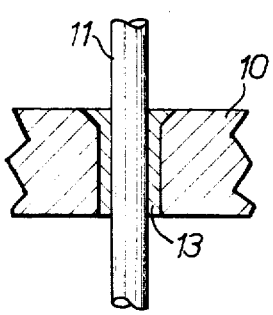

The deposited layer of nickel oxide 18 is then reduced by heating under dry hydrogen for 5 to 10 minutes (FIG. 6).

A nickelling operation is then carried out by electrolytic process.

This electrolytic nickelling is preferably obtained by introducing into the bore 12 an electrode formed by a U-shaped metal loop 19, of the hairpin type for example, this electrode being connected to the negative pole of an electric source 20, and by immersing the part 10 in a nickelling bath 22, the positive pole of the source 20 being connected in the usual manner to an electrode 21 plunging into the said bath.

The part 10 may of course comprise a number of bored holes which are all treated simultaneously, and in this case a U-shaped electrode 19 is engaged in each of these bores, these electrodes being connected to each other.

After an electrolytic deposit of nickel of this kind, the conductor 11 is placed in position in the bore 12, this conductor is surrounded by a small ring 23 of brazing material, this ring being placed in position in the chamfer 14, and the assembly is heated to the melting point of this ring of brazing material.

Such brazing material may be a metal such as silver, copper or a metallic alloy such as for example the alloys silver-copper or gold-nickel or again it may be constituted by means of one of the brazing pastes ready prepared for this use, which can be obtained commercially.

Figure 10:
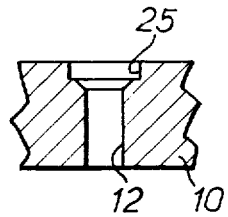
FIG. 10 is a view similar to that of FIG. 2, and relates to an alternative form of procedure.

In certain cases, it is essential to avoid overflowing of the brazing material outside the bore 12, and this is effected by placing the conical chamfer 14 at the bottom of a cylindrical recess 25 (see FIG. 10).

It will of course be understood that the present invention is not limited to the method of utilization described and shown, but includes any alternative form of execution.

What we claim is:

1. A method for sealing a metal part to a ceramic part comprising the consecutive steps of metalizing the ceramic part with metalizing material containing at least one metallic derivative, sintering the metalized ceramic part, then nickeling the ceramic part first chemically in a reducing atmosphere at an elevated temperature and then electrolytically, the metalizing step comprising spreading the metalizing material on the ceramic part by reciprocating a substantially rigid applicator member in sliding contact with the ceramic part.

2. A method as claimed in claim 1, wherein the substantially rigid applicator member is a rod, and the metalizing material is applied by reciprocating sliding movement of the rod relative to the ceramic part.

3. A method as claimed in claim 1, wherein the ceramic part has a bore therein, and wherein the metalizing material is applied in the bore by axial reciprocating sliding movement of a rod in the bore.

4. A method as claimed in claim 3, wherein the electrolytic nickeling comprises inserting a U-shaped metal loop into the bore in the ceramic part and connecting said loop to the negative pole of an electric source.

5. A method as claimed in claim 3, wherein a countersink is provided at an end of the bore.

6. A method as claimed in claim 5, where in the countersink is frustoconical in shape.

7. A method as claimed in claim 1 in which a peripheral clearance of 0.03 to 0.05 mm is provided between said metal part and said bore, and brazing said metal part in said core.

* * * * *